United States Patent
Okada

(10) Patent No.: US 10,620,320 B2
(45) Date of Patent: Apr. 14, 2020

(54) POSITION ESTIMATION SYSTEM AND ESTIMATION METHOD

(71) Applicant: CLARION CO., LTD., Saitama (JP)

(72) Inventor: Kazuhiro Okada, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 413 days.

(21) Appl. No.: 15/450,427

(22) Filed: Mar. 6, 2017

(65) Prior Publication Data

US 2017/0299729 A1  Oct. 19, 2017

(30) Foreign Application Priority Data

Apr. 19, 2016  (JP) .................................. 2016-083340

(51) Int. Cl.
  *G01S 19/47*  (2010.01)
  *G01C 21/16*  (2006.01)

(52) U.S. Cl.
  CPC ............ *G01S 19/47* (2013.01); *G01C 21/165* (2013.01)

(58) Field of Classification Search
  CPC ....... G01C 21/165; G01S 19/47; G01S 19/39; G01S 19/49
  (Continued)

(56) References Cited

U.S. PATENT DOCUMENTS 6,081,230 A * 6/2000 Hoshino .............. G01C 21/165
                                                    342/357.32
6,408,245 B1   6/2002 An et al.
(Continued)

FOREIGN PATENT DOCUMENTS

JP  2001-174275 A  6/2001
JP  2010-008095 A  1/2010
(Continued)

OTHER PUBLICATIONS

Fusini Lorenzo et al., "A Uniformly Semiglobally Exponentially Stable Nonlinear Observer for GNSS- and Camera-Aided Inertial Navigation", 2014 22nd Mediterranean Conference on Control and Automation (MED), University of Palermo, Jun. 16, 2014, pp. 1031-1036, Palermo Italy.

(Continued)

*Primary Examiner* — Timothy X Pham
(74) *Attorney, Agent, or Firm* — IP Business Solutions, LLC

(57) ABSTRACT

A navigation system includes a GPS reception unit receiving a GPS signal, an observation unit observing observables including a GPS vehicle position based on the received GPS signal, and an estimation unit estimating state quantities concerning the present location based on the observables and on the Kalman filter, the estimation unit calculates prediction values of the state quantities and errors of the prediction values, calculates estimation values of the state quantities and errors of the estimation values, based on the prediction values, the errors of the prediction values and errors of the observables observed, and, when calculating the estimation values and the errors of the estimation values, assigns a weight based on a period from a first timing to a second timing in which the GPS signal received in the first timing is not reflected in observation of the GPS vehicle position, to an error of the GPS vehicle position.

10 Claims, 5 Drawing Sheets

(58) Field of Classification Search
USPC .................................................. 342/357.3
See application file for complete search history.

(56) References Cited

U.S. PATENT DOCUMENTS

| | | | | |
|---|---|---|---|---|
| 2007/0250263 A1* | 10/2007 | Yamada | ............... | B60Q 1/085 701/408 |
| 2008/0082266 A1 | 4/2008 | Bye et al. | | |
| 2009/0093924 A1* | 4/2009 | Aso | ............... | B60W 40/10 701/31.4 |
| 2010/0211315 A1* | 8/2010 | Toda | ............... | G01C 21/165 701/472 |
| 2013/0035855 A1* | 2/2013 | Natroshvili | ............ | G01S 19/49 701/480 |
| 2014/0106775 A1 | 4/2014 | Mizuochi | | |
| 2019/0033465 A1* | 1/2019 | Kido | ............... | G01S 19/07 |

FOREIGN PATENT DOCUMENTS

| | | |
|---|---|---|
| JP | 2012-215491 A | 11/2012 |
| JP | 2015-094960 A | 5/2015 |

OTHER PUBLICATIONS

Extended European Search Report issued for corresponding European patent Application.

Japanese Office Action mailed by Japanese Patent Office dated Jan. 7, 2020 in corresponding Japanese patent application No. 2016-083340.

Chinese Office Action mailed by Chinese Patent Office dated Jan. 22, 2020 in corresponding Chinese patent application No. 2017102546760.

* cited by examiner

POSITION ESTIMATION SYSTEM AND ESTIMATION METHOD

INCORPORATION BY REFERENCE

The present application claims priority under 35 U.S.C. § 119 to Japanese Patent Application No. 2016-083340 filed on Apr. 19, 2016. The content of the application is incorporated herein by reference in its entirety.

BACKGROUND OF THE INVENTION

Field of the Invention

The present invention relates to a position estimation system and estimation method.

Description of the Related Art

As a related art of the present technical field, there is a Japanese Patent Laid-Open No. 2012-215491 (Patent Literature 1). Patent Literature 1 indicates that "In a position calculation device 1 including a GPS unit 3 and an INS (registered trade name) unit 5, a position calculation precision determination section 6 determines position calculation precision. An influence rate setting section 7 sets an influence rate of a GPS measurement result to an INS measurement result based on the position calculation precision determined by the position calculation precision determination section 6. A coupling processing section 9 carries out coupling processing of the GPS measurement result and the INS measurement result based on the influence rate set by the influence rate setting section 7, and calculates a position of a mobile body.".

[Patent Literature 1] Japanese Patent Laid-Open No. 2012-215491

SUMMARY OF THE INVENTION

In general, when the states concerning a present location such as a position and an azimuth are estimated based on a Kalman filter, errors of observables of a position, an azimuth and the like that are observed based on sensors, GPS signals and the like are on the precondition that these errors are white errors the average of which is zero. However, errors of positions observed based on GPS signals may be colored errors the average of which is not zero. In Patent Literature 1, consideration is not given to the fact that the errors of the positions observed based on GPS signals are colored errors, and the state concerning the present location cannot be estimated precisely by a Kalman filter.

Consequently, the present invention has an object to enable a state concerning a present location to be accurately estimated by a Kalman filter.

In order to attain the above described object, a position estimation system includes a GPS reception unit that receives a GPS signal, an observation unit that observes observables including a GPS positioning position based on the GPS signal received by the GPS reception unit, and an estimation unit that estimates state quantities concerning a present location based on the observables observed by the observation unit and on a Kalman filter, wherein the estimation unit calculates prediction values of the state quantities, and errors of the prediction values, calculates estimation values of the state quantities and errors of the estimation values, based on the prediction values, the errors of the prediction values and errors of the observables observed by the observation unit, and when calculating the estimation values and the errors of the estimation values, assigns a weight based on a period from a first timing to a second timing in which the GPS signal received in the first timing is not reflected in observation of the GPS positioning position by the observation unit, to an error of the GPS positioning position.

According to an aspect of the present invention, the state concerning the present location can be estimated with high precision by a Kalman filter.

DETAILED DESCRIPTION OF THE PREFERRED EMBODIMENT

Figure 1:
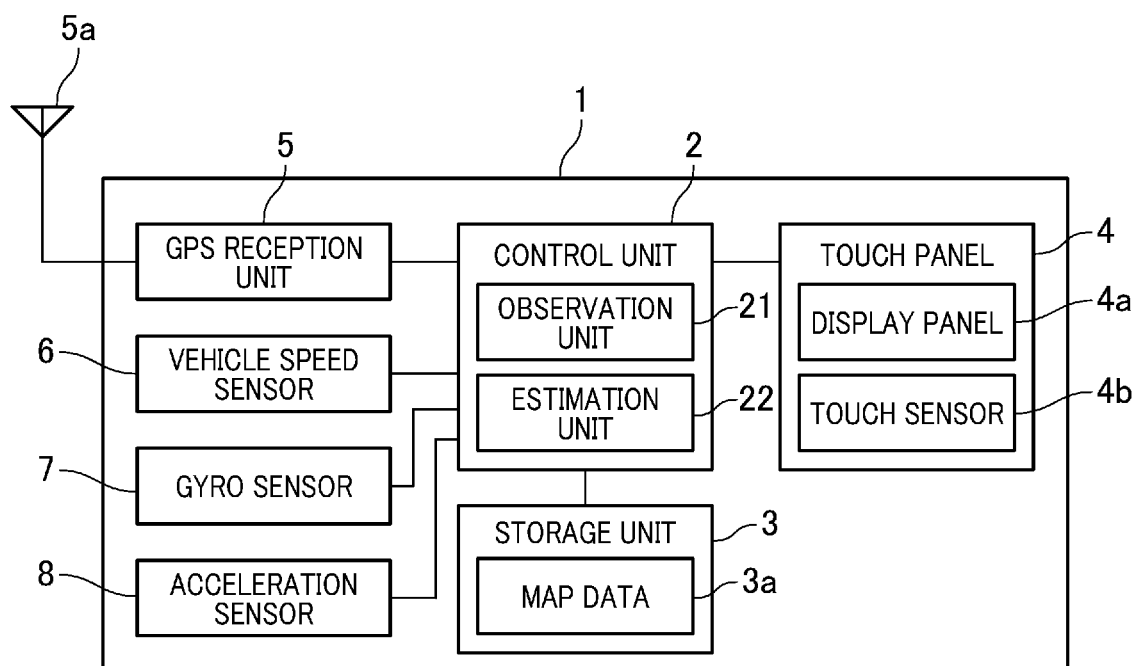
FIG. 1 is a block diagram illustrating a configuration of a navigation system.

FIG. 1 is a block diagram illustrating a configuration of a navigation system 1 (a position estimation system, an on-vehicle system).

The navigation system 1 is an on-vehicle system that is installed on a vehicle, and executes display of a map, display of a present location of a vehicle in the map, route search to a destination, route guide and the like in accordance with an operation of a user riding in a vehicle. Note that the navigation system 1 may be fixed to a dashboard or the like of the vehicle, or may be attachable to and detachable from the vehicle.

As illustrated in FIG. 1, the navigation system 1 includes a control unit 2, a storage unit 3, a touch panel 4, a GPS reception unit 5, a vehicle speed sensor 6, a gyro sensor 7, and an acceleration sensor 8.

The control unit 2 includes a CPU, a ROM, a RAM, other control circuits and the like, and controls the respective units of the navigation system 1. The control unit 2 functions as an observation unit 21 and an estimation unit 22 that will be described later, by executing a control program stored in the ROM, the storage unit 3, and the like.

The storage unit 3 includes a hard disk, a nonvolatile memory such as an EEPROM, and stores data to be rewritable. The storage unit 3 stores map data 3a in addition to control programs executed by the control unit 2. The map data 3a has node information concerning nodes representing intersection points, other connection points on a road network, link information concerning links representing road sections between nodes and nodes, information relating to display of maps and the like. The link information includes at least information concerning a position of a link and information concerning an azimuth of the link, for each of the links.

The touch panel 4 includes a display panel 4a and a touch sensor 4b. The display panel 4a is configured by a liquid crystal display, an EL (Electro Luminescent) display or the like, and displays various kinds of information on the display panel 4a under control of the control unit 2. The touch sensor 4b is disposed by being superimposed on the display panel 4a, detects a touch operation of a user, and outputs a signal indicating a position to which the touch operation is applied to the control unit 2. The control unit 2 executes processing corresponding to the touch operation based on an input from the touch sensor 4b.

The GPS reception unit 5 receives a GPS signal that is transmitted from a GPS satellite via a GPS antenna 5a. The GPS reception unit 5 measures a distance between the vehicle and the GPS satellite, and a change rate of the distance for each of a predetermined number of satellites or more based on the received GPS signal, and thereby calculates at least a position (GPS positioning position) of the vehicle and a compass bearing of a traveling direction of the vehicle (hereinafter, expressed as "an azimuth of the vehicle"). Further, when the GPS reception unit 5 calculates the position of the vehicle and the azimuth of the vehicle, the GPS reception unit calculates the position of the vehicle and the azimuth of the vehicle by taking into account the received GPS signal, the position of the vehicle and the azimuth of the vehicle that are calculated at a previous time. In the following explanation, the position of the vehicle based on the GPS signal will be expressed as a GPS vehicle position. When the GPS reception unit 5 calculates the GPS vehicle position and the azimuth of the vehicle, the GPS reception unit 5 calculates an error of the GPS vehicle position and an error of the azimuth of the vehicle. The GPS reception unit 5 outputs the information indicating the GPS vehicle position, information indicating the error of the GPS vehicle position, information indicating the azimuth of the vehicle, and information indicating the error of the azimuth of the vehicle, to the control unit 2.

The vehicle speed sensor 6 detects a vehicle speed of the vehicle, and outputs a signal indicating the detected vehicle speed to the control unit 2.

The gyro sensor 7 is configured by a vibration gyroscope, for example, and detects an angular speed by rotation of the vehicle. The gyro sensor 7 outputs a signal indicating the detected angular speed to the control unit 2.

The acceleration sensor 8 detects an acceleration (for example, an inclination of the vehicle relative to a traveling direction) that acts on the vehicle. The acceleration sensor 8 outputs a signal indicating the detected acceleration to the control unit 2.

As illustrated in FIG. 1, the control unit 2 includes the observation unit 21 and the estimation unit 22.

The observation unit 21 observes observables concerning a variation of the vehicle based on the signals outputted from the vehicle speed sensor 6, the gyro sensor 7, and the acceleration sensor 8, and the information that is outputted from the GPS reception unit 5.

The observation unit 21 observes the speed of the vehicle as the observable based on the signal indicating the vehicle speed that is outputted from the vehicle speed sensor 6. The observation unit 21 calculates the speed of the vehicle and an error of the speed of the vehicle from the signal indicating the vehicle speed by a predetermined arithmetic operation.

Further, the observation unit 21 observes the angular speed by rotation of the vehicle as an observable, based on a signal indicating the angular speed, which is outputted from the gyro sensor 7. The observation unit 21 calculates the angular speed of the vehicle and an error of the angular speed of the vehicle from the signal indicating the angular speed by a predetermined arithmetic operation.

Further, the observation unit 21 observes an acceleration of the vehicle as an observable, based on the signal indicating an acceleration, which is outputted from the acceleration sensor 8. The observation unit 21 calculates the acceleration of the vehicle and an error of the acceleration of the vehicle from the signal indicating the acceleration by a predetermined arithmetic operation.

Further, the observation unit 21 observes the GPS vehicle position and the azimuth of the vehicle as observables, based on the information indicating the GPS vehicle position and the information indicating the azimuth of the vehicle that are outputted from the GPS reception unit 5.

The estimation unit 22 estimates a state quantity indicating a state concerning a present location of the vehicle by a Kalman filter, based on the speed of the vehicle, the acceleration of the vehicle, the angular speed of the vehicle, the position of the vehicle, and the azimuth of the vehicle, which are observed by the observation unit 21. In the present embodiment, the estimation unit 22 estimates the speed of the vehicle, the angular speed of the vehicle, the position of the vehicle and the azimuth of the vehicle as the state quantities of the vehicle.

As will be described later, the control unit 2 executes evaluation of links which are objects of map matching based on the state quantities of the vehicle, which are estimated by the estimation unit 22.

Note that the speed of the vehicle estimated by the estimation unit 22 corresponds to the state quantity of the vehicle. Further, the speed of the vehicle observed by the observation unit 21 corresponds to the observable. Likewise, the angular speed of the vehicle estimated by the estimation unit 22 corresponds to the state quantity of the vehicle. Further, the angular speed of the vehicle observed by the observation unit 21 corresponds to the observable.

Here, estimation of basic state quantities of the vehicle by the Kalman filter will be described.

In the present embodiment, the state quantities of the vehicle which are estimated by the Kalman filter are the position of the vehicle, the azimuth of the vehicle, the speed of the vehicle and the angular speed of the vehicle. Hereinafter, respective state quantities of the vehicle that are estimated by the Kalman filter will be shown.

x: x-coordinate of the position of the vehicle
y: y-coordinate of the position of the vehicle
θ: azimuth of the vehicle
v: speed of the vehicle
ω: angular speed of the vehicle Here, when state vectors expressing the state quantities of the vehicle by vectors are (x, y, θ, v, ω), the state equation about the state quantities of the vehicle is expressed by equation (1).

[Expression 1]

$$\begin{bmatrix} x_{k+1} \\ y_{k+1} \\ \theta_{k+1} \\ v_{k+1} \\ \omega_{k+1} \end{bmatrix} = \begin{bmatrix} x_k + \cos(\theta_k) v_k T \\ y_k + \sin(\theta_k) v_k T \\ \theta_k + \omega_k T \\ v_k \\ \omega_k \end{bmatrix} + q_k \quad (1)$$

Subscripts k+1 and k indicate time points. For example, $(x_{k+1}, y_{k+1}, \theta_{k+1}, v_{k+1}, \omega_{k+1})$ that is a left side of equation (1) shows the state quantities of the vehicle at a time point k+1. In equation (1), $q_k$ of a second term in a right side is system noise (average 0, normal distribution N (0, $Q_k$) having $Q_k$ that is an error covariance matrix). The error covariance matrix refers to a matrix of variance and covariance.

As described above, the observation unit 21 observes the speed of the vehicle, the angular speed of the vehicle, the acceleration of the vehicle, the GPS vehicle position, and the azimuth of the vehicle, as the observables. As described above, the observation unit 21 observes the speed of the vehicle based on the output from the vehicle speed sensor 6. Further, the observation unit 21 observes the angular speed of the vehicle based on the output from the gyro sensor 7. Further, the observation unit 21 observes the acceleration of the vehicle based on the output from the acceleration sensor 8. Further, the observation unit 21 observes the GPS vehicle position and the azimuth of the vehicle based on the outputs from the GPS reception unit 5. Hereinafter, the observables that are observed by the observation unit 21 will be shown. Note that the speed of the vehicle, the angular speed of the vehicle, the GPS vehicle position and the azimuth of the vehicle are illustrated as observables below.

$v^{PLS}$: speed of the vehicle observed based on the output from the vehicle speed sensor 6

$\omega^{GYR}$: angular speed of the vehicle observed based on the output from the gyro sensor 7

$x^{GPS}$: x-coordinate of the GPS vehicle position observed based on the output from the GPS reception unit 5

$y^{GPS}$: y-coordinate of the GPS vehicle position observed based on the output from the GPS reception unit 5

$\theta^{GPS}$: azimuth of the vehicle observed based on the output from the GPS reception unit 5

Here, when the observation vectors expressing the above described observables by vectors are ($v^{PLS}$, $\omega^{GYR}$, $x^{GPS}$, $y^{GPS}$, $\theta^{GPS}$), an observation equation about the observables is expressed by equation (2).

[Expression 2]

$$\begin{bmatrix} v_k^{PLS} \\ \omega_k^{GYR} \\ x_k^{GPS} \\ y_k^{GPS} \\ \theta_k^{GPS} \end{bmatrix} = \begin{bmatrix} v_k \\ \omega_k \\ x_k \\ y_k \\ \theta_k \end{bmatrix} + r_k \qquad (2)$$

In expression (2), $r_k$ represents observation noise (a normal distribution N (0, $R_k$) having $R_k$ that is an error covariance matrix, with an average of 0).

Hereinafter, a Kalman filter will be explained by being divided into prediction processing of predicting the state quantities of a vehicle, and estimation processing of estimating the state quantities of the vehicle.

Note that in the following explanation, a value assigned with a subscript k+1|k represents a prediction value at a time point k+1, which is predicted based on information up to a time point k. Further, a value assigned with a subscript k+1|k+1 indicates an estimation value at a time point k+1 estimated based on the information up to the time point k+1. Further, a value assigned with a subscript k|k indicates an estimation value at a time point k that is estimated based on the information up to the time point k.

<Prediction Processing>

In a Kalman filter, the prediction processing is processing of calculating prediction values (hereinafter, expressed as "vehicle state prediction values") of state quantities of a vehicle, and an error covariance matrix (errors of prediction values) of the vehicle state prediction values. The vehicle state prediction values are calculated based on equation (3). Note that calculation of the error covariance matrix refers to calculation of values of respective components of the error covariance matrix.

[Expression 3]

$$\begin{bmatrix} x_{k+1|k} \\ y_{k+1|k} \\ \theta_{k+1|k} \\ v_{k+1|k} \\ \omega_{k+1|k} \end{bmatrix} = \begin{bmatrix} x_{k|k} + \cos(\theta_{k|k})v_{k|k}T \\ y_{k|k} + \sin(\theta_{k|k})v_{k|k}T \\ \theta_{k|k} + \omega_{k|k}T \\ v_{k|k} \\ \omega_{k|k} \end{bmatrix} \qquad (3)$$

Equation (3) shows calculation of the vehicle state prediction values at the time point k+1, which are predicted based on the information up to the time point k. The vehicle state prediction values are calculated by the estimation values of the state quantities of the vehicle at the time point k, which are estimated based on the information up to the time point k, as shown in a right side of equation (3). For example, $x_{k+1|k}$ indicating a prediction value of the x-coordinate of the position of the vehicle is calculated based on an estimation value of an x-coordinate ($x_{k|k}$) of the position of the vehicle, an estimation value of an azimuth ($\theta_{k|k}$) of the vehicle and an estimation value of a speed ($v_{k|k}$) of the vehicle, at the time point k, which are estimated based on the information up to the time point k. Note that in equation (3), T represents an interval at which the observation unit 21 observes each of the observables based on outputs from the vehicle speed sensor 6, the gyro sensor 7 and the acceleration sensor 8.

Note that when the vehicle state prediction values at the time point k, which are predicted based on information up to a time point k−1 are calculated, the vehicle state prediction values can be calculated by an equation in which the time points in equation (3) are each reduced by one step. That is, the vehicle state prediction values at the time point k, which are predicted based on the information up to the time point k−1 are calculated based on estimation values of the state quantities of the vehicle at the time point k−1, which are estimated based on the information up to the time point k−1.

The error covariance matrix of the vehicle state prediction values are calculated based on equation (4). The error covariance matrix is a matrix of variance and covariance concerning the state quantities of the vehicle in the present embodiment. Variance is obtained by squaring an error. That is, variance of the state quantities of the vehicle is a result of squaring errors of the state quantities of the vehicle. Accordingly, calculating the error covariance matrix of the vehicle state prediction values corresponds to calculating errors of the vehicle state prediction values.

[Expression 4]

$$P_{(k+1|k)} = F_{(k)} P_{(k|k)} F^T_{(k)} + Q \qquad (4)$$

In equation (4), P represents the error covariance matrix. A left side of equation (4) shows the error covariance matrix at the time point k+1, which is predicted based on the information up to the time point k. The error covariance matrix shown in the left side of equation (4) is calculated based on the error covariance matrix at the time point k, which is estimated based on the information up to the time point k. Note that F represents a Jacobi matrix obtained from a state equation of equation (1). Further, a superscript T in F represents a transposed matrix. Further, Q represents an error covariance matrix of system noise.

Note that when the error covariance matrix of the vehicle state prediction values at the time point k which are predicted based on the information up to the time point k−1 are calculated, the error covariance matrix can be calculated by an equation in which the time points of the subscripts of P in equation (4) are each reduced by one step. That is, the error covariance matrix of the vehicle state prediction values at the time point k, which are predicted based on the information up to the time point k−1, is calculated based on the error covariance matrix of the estimation values of the state quantities of the vehicle at the time point k−1, which are estimated based on the information up to the time point k−1.

In this way, in the prediction processing, in the case of predicting the state quantities of the vehicle at the time point k+1, for example, the vehicle state prediction values at the time point k+1, which are calculated based on the information up to the time point k, and the error covariance matrix of the vehicle state prediction values at the time point k+1, which are calculated based on the information up to the time point k, are calculated. That is, the prediction processing predicts probability distribution of the state quantities of the vehicle.

<Estimation Processing>

Next, estimation processing will be described.

The estimation processing in a Kalman filter is processing of calculating estimation values of the state quantities of the vehicle (hereinafter, expressed as "vehicle state estimation values"), and an error covariance matrix of the vehicle state estimation values (errors of the estimation values), based on the vehicle state prediction values calculated in the prediction processing, and the error covariance matrix of the vehicle state prediction values.

In the estimation processing, observation residual errors are calculated by equation (5). The observation residual errors refer to differences between observables, and values corresponding to observables calculated from the vehicle state prediction values.

[Expression 5]

$$\begin{bmatrix} e_k^v \\ e_k^\omega \\ e_k^x \\ e_k^y \\ e_k^\theta \end{bmatrix} = \begin{bmatrix} v_k^{PLS} \\ \omega_k^{GYR} \\ x_k^{GPS} \\ y_k^{GPS} \\ \theta_k^{GPS} \end{bmatrix} - H \begin{bmatrix} x_k \\ y_k \\ \theta_k \\ v_k \\ \omega_k \end{bmatrix} \quad (5)$$

In equation (5), a left side represent observation residual error vectors expressing observation residual errors by vectors. Further, in equation (5), a first term in a right side shows observation vectors of observables observed by the observation unit 21 at the time point k. Further, in equation (5), a second term in the right side is a result of multiplying the vehicle state prediction values predicted in the prediction processing by "H" indicating an observation matrix obtained by an observation equation.

The vehicle state estimation values are calculated by equation (6) by using the observation residual errors shown in equation (5).

[Expression 6]

$$\begin{bmatrix} x_{k+1|k+1} \\ y_{k+1|k+1} \\ \theta_{k+1|k+1} \\ v_{k+1|k+1} \\ \omega_{k+1|k+1} \end{bmatrix} = \begin{bmatrix} x_{k+1|k} \\ y_{k+1|k} \\ \theta_{k+1|k} \\ v_{k+1|k} \\ \omega_{k+1|k} \end{bmatrix} + K_k \begin{bmatrix} e_k^v \\ e_k^\omega \\ e_k^x \\ e_k^y \\ e_k^\theta \end{bmatrix} \quad (6)$$

Equation (6) shows vehicle state estimation values at the time point k+1, which are predicted based on the information up to the time point k+1. The vehicle state estimation values are calculated by correcting the vehicle state prediction values at the time point k+1, which are estimated based on the information up to the time point k, by the observation residual errors, as shown in the right side of equation (6). Note that when the vehicle state estimation values at the time point k, which are predicted based on the information up to the time point k, are calculated, the vehicle state estimation values at the time point k are calculated by correcting the vehicle state prediction values at the time point k which are predicted based on the information up to the time point k−1 by the observation residual errors.

As described above, equation (6) shows an equation calculating the vehicle state estimation values by correcting the vehicle state prediction values by using the observation residual errors. As shown in equation (6), $K_k$ is used as a correction coefficient at the time of correcting the vehicle state prediction values by the observation residual errors. The correction coefficient $K_k$ is called a Kalman gain, and is expressed by equation (7).

[Expression 7]

$$K_k = P_{(k+1|k)} H^T (R_k + H P_{(k+1|k)} H^T)^{-1} \quad (7)$$

In equation (7), $R_k$ represents an error covariance matrix of observation noise. In the present embodiment, the error covariance matrix of the observation noise refers to an error covariance matrix showing errors of the observables. Hereinafter, the error covariance matrix is expressed as the error covariance matrix of the observables. As described above, the error covariance matrix is a matrix of variance and covariance obtained by squaring the errors. Accordingly, $R_k$ is a matrix of variance and covariance obtained by squaring the errors of the observables. That is, the error covariance matrix of the observables corresponds to errors of the observables. Note that in equation (7), "−1" which is a subscript indicates an inverse matrix.

The Kalman gain $K_k$ shown in equation (7) is calculated based on the error covariance matrix ($P_{k+1|k}$) of the vehicle state prediction values at the time point k+1 based on the information up to the time point k, and the error covariance matrix ($R_k$) of the observables observed at the time point k.

The Kalman gain $K_k$ is a coefficient for determining whether to calculate the vehicle state estimation values by attaching great importance to the vehicle state prediction values, or to calculate the vehicle state estimation values by attaching great importance to the observables observed by the observation unit 21, at the time of calculating the vehicle state estimation values in equation (6).

For example, when errors of the observables based on the outputs from the vehicle speed sensor 6, the gyro sensor 7 and the GPS reception unit 5 are sufficiently smaller than the errors of the vehicle state prediction values, the vehicle state estimation values are desirably the observables, because the errors of the observables are sufficiently small. That is, when the value of $R_k$ that is the error covariance matrix of the observables is sufficiently smaller than the value of $P_{k+1|k}$ that is the error covariance matrix of the vehicle state prediction value, the left side of equation (6) that is the vehicle state prediction value desirably becomes the first term of the right side of equation (5), which corresponds to the observable. This is because the vehicle state prediction values become values having sufficiently small errors, in other words, values with high precision. Here, when the Kalman gain $K_k$ in the case of the value of $R_k$ being sufficiently small is set as $K_k=H^{-1}$, and is given to equation (6), a first term in the right side of equation (6) is eliminated based on a relationship with equation (5). That is, the vehicle state estimation values are observables having sufficiently small errors.

Further, when the errors of the vehicle state prediction values are sufficiently smaller than the errors of the observables based on the outputs from the vehicle speed sensor 6, the gyro sensor 7 and the GPS reception unit 5, the vehicle state estimation values desirably become the vehicle state prediction values. That is, when a value of $P_{k+1|k}$ that is the error covariance matrix of the vehicle state prediction values is sufficiently smaller than the value of $R_k$ that is the error covariance matrix of the observables, the left side of equation (6) that corresponds to the vehicle state prediction values desirably becomes the first term in the right side of equation (6), which corresponds to the vehicle state prediction values. This is because the vehicle state estimation values become values having sufficiently smaller errors than the errors of the observables, in other words, the values with high precision. Here, when the Kalman gain $K_k$ in the case of the error covariance matrix of the vehicle state prediction values being sufficiently smaller than the value of $R_k$ is set as $K_k=0$, and is given to equation (6), the vehicle state estimation values become the vehicle state prediction values.

In this way, the Kalman gain $K_k$ is a coefficient that is set so that the vehicle state estimation values become proper values in accordance with $R_k$ that is the error covariance matrix of the observables, and the error covariance matrix of the vehicle state prediction values. That is, the Kalman gain $K_k$ is a coefficient that is set so that the vehicle state estimation values become values with importance attached to a smaller error covariance matrix, that is, with smaller errors, of the observables and the vehicle state prediction values, based on the error covariance matrix of the observables observed by the observation unit 21, and the error covariance matrix of the vehicle state prediction values. Further, the Kalman gain $K_k$ is set so that the vehicle state estimation values become suitable values in accordance with the error covariance matrix of the observables based on the outputs from the vehicle speed sensor 6, the gyro sensor 7 and the GPS reception unit 5, when the error covariance matrix of the vehicle state prediction values are accurately predicted, in other words, when the error covariance matrix is accurately calculated.

The error covariance matrix of the vehicle state estimation values is calculated by equation (8). As described above, the error covariance matrix is a matrix of variance and covariance, concerning the state quantities of the vehicle, in the present embodiment. Variance of the state quantities of the vehicle is a result of squaring the errors of the state quantities of the vehicle. Accordingly, calculating the error covariance matrix of the vehicle state estimation values corresponds to calculating the errors of the vehicle state estimation values.

[Expression 8]

$$P_{k+1|k+1}=(I-K_kH)P_{k+1|k} \qquad (8)$$

In equation (8), P represents the error covariance matrix as in equation (4). Further, in equation (8), I represents a unit matrix. A left side of equation (8) shows the error covariance matrix at the time point k+1, which is estimated based on the information up to the time point k+1. The error covariance matrix shown in the left side of equation (8) is calculated based on the error covariance matrix at the time point k+1, which is predicted based on the information up to the time point k.

Note that when the error covariance matrix of the vehicle state estimation values at the time point k, predicted based on the information up to the time point k is calculated, the error covariance matrix of the vehicle state estimation values can be calculated by equation in which the time point of the subscript of P is reduced by one step in equation (8). That is, the error covariance matrix of the vehicle state estimation values at the time point k, which are predicted based on the information up to the time point k is calculated by the error covariance matrix of the vehicle state prediction values at the time point k, which are estimated based on the information up to the time point k−1.

Equation (8), the error covariance matrix of the vehicle state estimation values, is an equation in which the error covariance matrix of the vehicle state prediction values is multiplied by $(I-K_kH)$. As shown in equation (8), the error covariance matrix of the vehicle state estimation values depends on the value of the Kalman gain $K_k$.

For example, when $K_k=H^{-1}$ is given to equation (8) as the Kalman gain $K_k$ in the case of the errors of the observables, that is, $R_k$ being sufficiently small, the error covariance matrix of the vehicle state estimation values becomes a zero matrix. This indicates that the errors of the vehicle state estimation values that are estimated are sufficiently small.

Further, by giving $K_k=0$ as the value of the Kalman gain in the case of the errors of the vehicle state prediction values being sufficiently smaller than the errors of the observables, the error covariance matrix of the vehicle state estimation values becomes the error covariance matrix of the vehicle state prediction values. This indicates that the errors of the vehicle state estimation values are errors of the vehicle state prediction values that are sufficiently smaller than the errors of the observables.

In this way, the Kalman gain $K_k$ is set so that the error covariance matrix of the vehicle state estimation values becomes suitable, in accordance with the error covariance matrix of the observables and the error covariance matrix of the vehicle state prediction values, in equation (8). That is, the Kalman gain $K_k$ is set so that the error covariance matrix of the vehicle state estimation values becomes suitable based on precision of the observables and precision of the vehicle state prediction values.

As above, in the estimation processing, in the case of estimating the state quantities of the vehicle at the time point k+1, for example, the vehicle state estimation values at the time point k+1 which are calculated based on the information up to the time point k+1, and the error covariance matrix of the vehicle state estimation values at the time point k+1 which are calculated based on the information up to the time point k+1 are calculated. That is, the estimation processing estimates probability distributions of the state quantities of the vehicle based on the probability distributions of the state quantities of the vehicle predicted in the prediction processing.

From the above calculation, the estimation unit 22 estimates the state of the vehicle by calculating the vehicle state estimation values, and the error covariance matrix of the vehicle state estimation values by the Kalman filter.

As described above, the Kalman gain $K_k$ is a coefficient for properly setting the vehicle state estimation values and the error covariance matrix of the vehicle state estimation values. That is, precision of estimation of the state of the vehicle depends on the Kalman gain $K_k$. The Kalman gain $K_k$ is the coefficient for properly setting the vehicle state estimation values and the error covariance matrix of the vehicle state estimation values in accordance with the error covariance matrix of the observables and the error covariance matrix of the vehicle state prediction values as described above.

Incidentally, in the Kalman filter, it is the precondition that the system noise, and observation noise are white noise. That is, when errors are dealt as noise in the Kalman filter, it is the precondition that the errors are white errors with the average of the errors being zero. Accordingly, it is the precondition that the errors of the observables that are used in calculation of the Kalman gain $K_k$ are white errors. However, out of the observables which are observed by the observation unit 21, at least the error of the GPS vehicle position may show colored errors with an average of the errors not being zero due to multipath, the influence of the satellite dispositions of the GPS satellites and the like. In this case, the Kalman gain $K_k$ is not accurately calculated, since the errors of the observables are colored errors. This indicates that the vehicle state estimation values and the error covariance matrix of the vehicle state estimation values cannot be calculated precisely, that is, the state of the vehicle cannot be estimated precisely.

Thus, the estimation unit 22 of the present embodiment sets the error of the GPS vehicle position, and estimates the state of the vehicle based on the Kalman filter, as will be described below.

Hereinafter, estimation of the state of the vehicle by the estimation unit 22 will be described through an operation of the navigation system 1 at the time of estimating the state of the vehicle.

Figure 2:
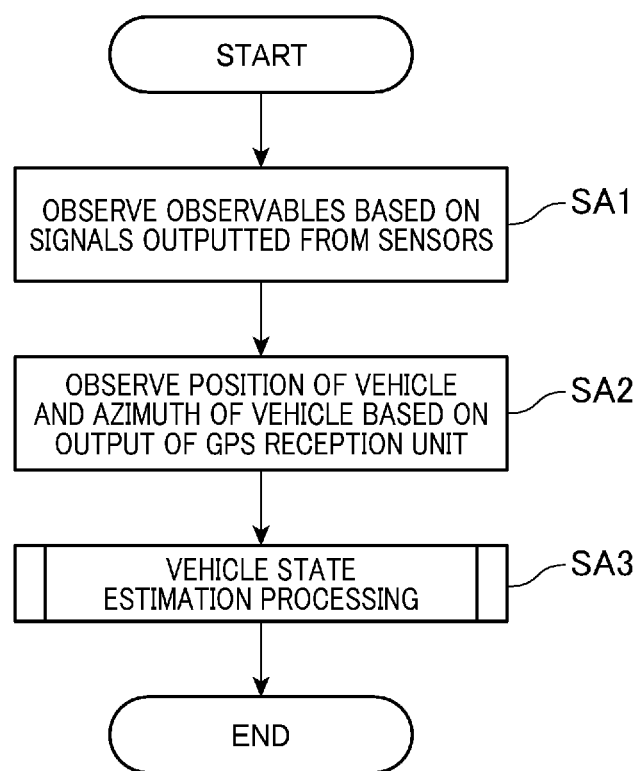
FIG. 2 is a flowchart illustrating an operation of the navigation system.

FIG. 2 is a flowchart illustrating the operation of the navigation system 1.

The observation unit 21 of the navigation system 1 observes the speed of the vehicle, the angular speed of the vehicle and the acceleration of the vehicle based on the signals outputted from the vehicle speed sensor 6, the gyro sensor 7 and the acceleration sensor 8 (step SA1). The observation unit 21 observes the speed of the vehicle, the angular speed of the vehicle and the acceleration of the vehicle every time the vehicle speed sensor 6, the gyro sensor 7 and the acceleration sensor 8 output signals. That is, the intervals at which the observation unit 21 observes them are the same intervals at which the vehicle speed sensor 6, the gyro sensor 7, and the acceleration sensor 8 perform detection.

Next, based on the outputs of the GPS reception unit 5, the observation unit 21 observes the GPS vehicle position, and the azimuth of the vehicle (step SA2). Every time the information indicating the GPS vehicle position and the information indicating the azimuth of the vehicle are outputted from the GPS reception unit 5, the observation unit 21 observes the GPS vehicle position and the azimuth of the vehicle. That is, intervals at which the observation unit 21 observes the GPS vehicle position and the azimuth of the vehicle are intervals at which the GPS reception unit 5 receives the GPS signals.

Next, the estimation unit 22 of the navigation system 1 executes the vehicle state estimation processing of estimating the state of the vehicle based on the observables observed by the observation unit 21 (step SA3).

Figure 3:
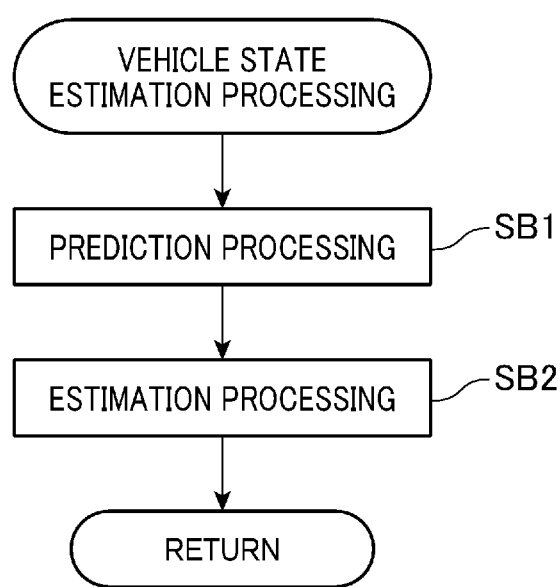
FIG. 3 is a flowchart illustrating an operation of an estimation unit in vehicle state estimation processing.

FIG. 3 is a flowchart illustrating the operation of the estimation unit 22 in the vehicle state estimation processing.

The estimation unit 22 executes prediction processing (step SB1). As described above, the prediction processing is processing of calculating the vehicle state prediction values, and the error covariance matrix of the vehicle state prediction values. The vehicle state prediction values are calculated by equation (3). The error covariance matrix of the vehicle state prediction values is calculated by equation (4).

Next, the estimation unit 22 executes estimation processing (step SB2). In the estimation processing, the estimation unit 22 calculates the Kalman gain $K_k$, based on equation (7), and calculates the vehicle state estimation values and the error covariance matrix of the vehicle state estimation values based on the calculated Kalman gain $K_k$, equation (5), equation (6) and equation (8).

When the estimation unit 22 calculates the Kalman gain $K_k$ based on equation (7), the estimation unit 22 sets the error of the GPS vehicle position out of the components included by the error covariance matrix of the observables, as shown in equation (9). Note that in the following explanation, the error of the GPS vehicle position that is inputted to $R_k$ that is the error covariance matrix of the observables will be expressed as the observation error of the GPS vehicle position, and the error of the GPS vehicle position which is observed by the observation unit 21 based on the output from the GPS reception unit 5 will be expressed as a positioning error of the GPS vehicle position, for convenience.

[Expression 9]

Observation error of GPS vehicle position=Positioning error of GPS vehicle position$\times\sqrt{2\tau}$ (9)

Equation (9) shows that the observation error of the GPS vehicle position is expressed by what is obtained by multiplying the positioning error of the GPS vehicle position by $\sqrt{(2\tau)}$. This indicates that the estimation unit 22 assigns a weight of $\sqrt{(2\tau)}$ based on $\tau$ to the positioning error of the GPS vehicle position, and sets the positioning error of the GPS vehicle position to which the weight is assigned as the observation error of the GPS vehicle position.

In equation (9), $\tau$ represents a correlation time constant. A correlation time constant indicates a period from a certain timing (a first timing) to another timing (a second timing) that is a timing in which a GPS signal received in the certain timing is not reflected in observation of the GPS vehicle position observed by the observation unit 21, and is different from the certain timing. Here, a correlation time constant will be described in detail.

Figure 4:
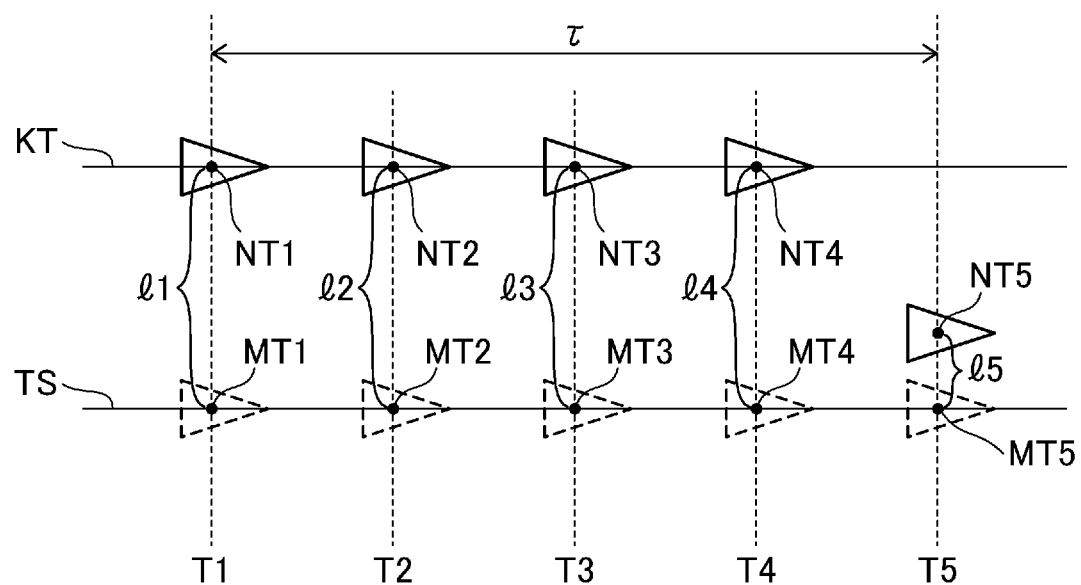
FIG. 4 is a diagram for explaining a correlation time constant.

FIG. 4 is a diagram for explaining the correlation time constant.

FIG. 4 illustrates a case where the vehicle travels on a straight line TS extending in a direction YZ toward a direction YZ1.

An influence concerning reception of a GPS signal (hereinafter, expressed as "a GPS reception influence") (a first influence) is assumed to occur in a timing T1 (the first timing). As the GPS reception influence, for example, an influence of a multipath, an influence of reduction in reception strength of the GPS signal due to the satellite dispositions of the GPS satellites and the like are cited.

In FIG. 4, an actual vehicle position in the timing T1 is set as a position MT1. As described above, FIG. 4 illustrates the case where the vehicle travels on the straight line TS, and therefore, the position MT1 is located on the straight line TS.

Further, in FIG. 4, the GPS vehicle position observed by the observation unit 21 in the timing T1 is set as a position NT1. As illustrated in FIG. 4, the position NT1 is located on a virtual straight line KT that extends in the direction YZ similarly to the straight line TS. The virtual straight line KT is a virtual straight line on which the GPS vehicle position observed by the observation unit 21 is located when an error (hereinafter, expressed as "a separation error") occurs between the actual vehicle position and the GPS vehicle position by the GPS reception influence that occurs in the timing T1. In the present embodiment, the virtual straight line KT is a straight line parallel with the straight line TS.

In this way, FIG. 4 illustrates the case where the observation unit 21 observes the position NT1 separated by a distance 11 from the position MT1 that is the actual vehicle position as the GPS vehicle position due to occurrence of the GPS reception influence in the timing T1. That is, FIG. 4 illustrates that in the timing T1, the separation error of the distance 11 occurs between the GPS vehicle position observed by the observation unit 21 and the actual vehicle position, by the GPS reception influence.

The positioning error of the GPS vehicle position by occurrence of the GPS reception influence is a large error as compared with the positioning error of the GPS vehicle position in the case where the GPS reception influence is absent. In the case of FIG. 4, the positioning error of the GPS vehicle position observed by the observation unit 21 in the timing T1, that is, the error of the position NT1 is a larger error by the GPS reception influence that occurs in the timing T1, as compared with the positioning error of the GPS vehicle position in the case where the GPS reception influence is absent.

Here, the positioning error of the GPS vehicle position becoming a large error by the GPS reception influence will be described by citing an example below.

The GPS reception unit 5 measures a distance (hereinafter, expressed as "a pseudo range") between a GPS satellite and the vehicle based on information on the position of the GPS satellite, a time point at which the GPS signal is transmitted and the like included by the received GPS signal, and a time point at which the GPS reception unit 5 receives the GPS signal and the like. The GPS reception unit 5 calculates a GPS vehicle position by performing a predetermined arithmetic operation based on pseudo ranges obtained with respect to a plurality of GPS satellites. Here, the influence of a multipath is assumed to occur as the GPS reception influence. A multipath is a phenomenon in which the GPS signals are received from a plurality of paths of direct waves that arrive directly from the GPS satellites, and reflection waves by reflection on a building or the like. The GPS signals are received from a plurality of paths in this way, and therefore, arrival times at the vehicle from the GPS satellites differ in the GPS signal of the direct wave and the GPS signal of the reflection wave. Consequently, a large error occurs to the pseudo range calculated based on the GPS signal of a reflection wave and a GPS signal of a composite wave with a direct wave and a reflection wave being composited, as compared with the pseudo range calculated based on the GPS signal of a direct wave. Accordingly, by occurrence of a large error with respect to the pseudo range, the positioning error of the GPS vehicle position observed by the observation unit 21 is larger as compared with the positioning error of the GPS vehicle position without the influence of a multipath.

Returning to explanation of FIG. 4, in a timing T2, the GPS reception influence that occurs in the timing T1 is assumed to continue. In FIG. 4, an actual vehicle position in the timing T2 is set as a position MT2. Similarly to the position MT1, the position MT2 is located on the straight line TS. Further, in FIG. 4, the GPS vehicle position observed by the observation unit 21 in the timing T2 is set as a position NT2.

FIG. 4 illustrates a case in which in the timing T2, the observation unit 21 observes the position NT2 apart by a distance 12 from the position MT2 that is the actual vehicle position, as the GPS vehicle position, by the GPS reception influence that occurs in the timing T1. That is, FIG. 4 indicates that in the timing T2, a separation error of the distance 12 occurs between the GPS vehicle position observed by the observation unit 21 and the actual vehicle position by the GPS reception influence that occurs in the timing T1.

As described above, the GPS reception unit 5 calculates the GPS vehicle position based on the received GPS signal, by taking into account the GPS vehicle position which is calculated at the previous time. Accordingly, in FIG. 4, at the time of calculating the position NT2 that is the GPS vehicle position in the timing T2, the GPS reception unit 5 calculates the position NT2 by taking into account the position calculated at the previous time, that is, the position NT1 which is the GPS vehicle position calculated in the timing T1. FIG. 4 shows that the position NT2 is located on the virtual straight line KT. In this way, by taking into account the position calculated at the previous time, the GPS reception unit 5 restrains a change of the GPS vehicle position from deviating with respect to a change of the actual vehicle position. That is, in the case of FIG. 4, when the vehicle travels toward the direction YZ1 on the straight line TS, the GPS vehicle position is calculated so that the GPS vehicle position moves toward the direction YZ1 on the virtual straight line KT by taking account the position calculated at the previous time. Thereby, the GPS reception unit 5 calculates the GPS vehicle position so that the GPS vehicle position changes to the direction YZ1 on the virtual straight line KT, in addition to that the actual vehicle position changes to the direction YZ1 on the straight line TS. FIG. 4 illustrates the case in which the position NT1 and the position NT2 are located on the virtual straight line KT, and therefore, the distance 11 and the distance 12 which are the separation distances have the same values.

Since the position which is calculated at the previous time is taken into account in this way, the GPS reception unit 5 calculates the GPS vehicle position in which the GPS vehicle position that is calculated based on the GPS signal received in the timing T1, that is, the position NT1 is reflected. That is, the observation unit 21 observes the GPS vehicle position in which the GPS signal received in the timing T1 is reflected, that is, the position NT2, in the timing T2.

The positioning error of the GPS vehicle position observed by the observation unit 21 in the timing T2 in FIG. 4, that is, an error of the position NT2 is a larger error as compared with the positioning error of the GPS vehicle position in the case where the GPS reception influence is absent, by the GPS reception influence that occurs in the timing T1.

Here, the error of the position NT1 and the error of the position NT2 are correlated with each other. This is because the error of the position NT1 and the error of the position NT2 are larger errors as compared with the error in the case where the GPS reception influence is absent, and therefore include the errors based on the GPS reception influence that occurs in the timing T1. More specifically, the error of the position NT1 and the error of the position NT2 include the errors based on the same GPS reception influence, and therefore, are errors mutually corresponding to the GPS reception influence. Consequently, the error of the position NT1 and the error of the position NT2 are correlated. Since the error of the position NT1 and the error of the position NT2 are correlated, and therefore are errors having correlativity. The errors having correlativity are errors an average of which is not zero. Accordingly, the error of the position NT1 and the error of the position NT2 are errors the average of which does not become zero, that is, colored errors.

The GPS reception influence that occurs in the timing T1 is assumed to be also continued, in a timing T3. In FIG. 4, an actual vehicle position in the timing T3 is set as a position MT3. Similarly to the position MT1 and the position MT2, the position MT3 is located on the straight line TS. Further, in FIG. 4, the GPS vehicle position observed by the observation unit 21 in the timing T3 is set as a position NT3.

FIG. 4 illustrates a case in which in the timing T3, the observation unit 21 observes the position NT3 apart by a distance 13 from the position MT3 that is the actual vehicle position, as the GPS vehicle position, by the GPS reception influence that occurs in the timing T1. That is, FIG. 4 shows that in the timing T3, a separation error of the distance 13 occurs between the GPS vehicle position observed by the observation unit 21 and the actual vehicle position, by the GPS reception influence that occurs in the timing T1.

When the GPS reception unit 5 calculates the position NT3 that is the GPS vehicle position in the timing T3, the GPS reception unit 5 calculates the position NT3 by taking into account the GPS vehicle position calculated in the timing T2. The GPS vehicle position calculated in the timing T2 is calculated by taking the position NT1 into account. Accordingly, the GPS reception unit 5 calculates the GPS vehicle position in which the GPS vehicle position calculated based on the GPS signal received in the timing T1 is reflected, in the timing T3. That is, the observation unit 21 observes the GPS vehicle position in which the GPS signal received in the timing T1 is reflected, in the timing T3.

Further, the GPS reception unit 5 takes into account the GPS vehicle position which is calculated at the previous time, and therefore calculates the position NT3 with a change of the GPS vehicle position restrained from deviating with respect to the change of the actual vehicle position. That is, the GPS reception unit 5 calculates the position NT3 so that the position NT3 is located on the virtual straight line KT because the same GPS reception influence as in the timing T1 is present in the timing T3. FIG. 4 illustrates the case where the position NT3 is located on the virtual straight line KT, and therefore the distance 13 which is the separation error has the same value as the distance 11 and the distance 12.

The positioning error of the GPS vehicle position observed by the observation unit 21 in the timing T3 in FIG. 4, that is, an error of the position NT3 is a larger error as compared with the error in the case where the GPS reception influence is absent, by the GPS reception influence that occurs in the timing T1.

Here, the error of the position NT2 and the error of the position NT3 are correlated with each other. This is because the error of the position NT2 and the error of the position NT3 are larger errors as compared with the error in the case where the GPS reception influence is absent, and therefore include the errors based on the GPS reception influence that occurs in the timing T1. More specifically, the error of the position NT2 and the error of the position NT3 include the error based on the GPS reception influence which occurs in the timing T1, and therefore, are errors mutually corresponding to the GPS reception influence, and are correlated with each other. The error of the position NT1 and the error of the position NT2 are correlated with each other in this way, and therefore are errors having correlativity. The errors having correlativity are errors an average of which is not zero as described above. Accordingly, the error of the position NT1 and the error of the position NT2 are errors the average of which does not become zero, that is, colored errors.

The GPS reception influence that occurs in the timing T1 is assumed to also continue in a timing T4. In FIG. 4, an actual vehicle position in the timing T4 is set as a position MT4. Further, in FIG. 4, the GPS vehicle position observed by the observation unit 21 in the timing T4 is set as a position NT4.

FIG. 4 illustrates a case in which in the timing T4, the observation unit 21 observes the position NT4 apart by a distance 14 from the position MT4 that is the actual vehicle position, as the GPS vehicle position, by the GPS reception influence that occurs in the timing T1. That is, FIG. 4 shows that in the timing T4, a separation error of the distance 14 occurs from the actual vehicle position with respect to the GPS vehicle position observed by the observation unit 21 by the GPS reception influence that occurs in the timing T1.

When the GPS reception unit 5 calculates the position NT4 that is the GPS vehicle position in the timing T4, the GPS reception unit 5 calculates the position NT4 by taking into account the GPS vehicle position calculated in the timing T3. The GPS vehicle position calculated in the timing T3 is calculated by taking the position NT2 into account. Accordingly, the GPS reception unit 5 calculates the GPS vehicle position in which the GPS vehicle position calculated based on the GPS signal received in the timing T1 is reflected, in the timing T4. That is, the observation unit 21 observes the GPS vehicle position in which the GPS signal received in the timing T1 is reflected, in the timing T4.

Further, the GPS reception unit 5 takes into account the GPS vehicle position which is calculated at the previous time, and therefore calculates the position NT4 with a change of the GPS vehicle position restrained from deviating from the change of the actual vehicle position. That is, the GPS reception unit 5 calculates the position NT4 so that the position NT4 is located on the virtual straight line KT because the same GPS reception influence as in the timing T1 is present in the timing T4. FIG. 4 illustrates the case where the position NT4 is located on the virtual straight line KT, and therefore the distance 14 which is the separation error has the same value as the distance 11, the distance 12 and the distance 13.

The error of the GPS vehicle position observed by the observation unit 21 in the timing T4 in FIG. 4, that is, an error of the position NT4 is a larger error as compared with the positioning error of the GPS vehicle position in the case where the GPS reception influence is absent, by the GPS reception influence that occurs in the timing T1.

Here, the error of the position NT3 and the error of the position NT4 are correlated with each other. This is because the error of the position NT3 and the error of the position NT4 are larger errors as compared with the error in the case where the GPS reception influence is absent, and therefore include the errors based on the GPS reception influence that occurs in the timing T1. More specifically, the error of the position NT3 and the error of the position NT4 include the errors based on the GPS reception influence which occurs in the timing T1, and therefore, become errors mutually corresponding to the GPS reception influence, and are correlated with each other. The error of the position NT3 and the error of the position NT4 are correlated with each other in this way, and therefore are errors having correlativity. Accordingly, the error of the position NT3 and the error of the position NT4 are errors the average of which do not become zero, that is, colored errors.

As described so far, FIG. 4 shows the positioning errors of the respective GPS vehicle positions in the timing T1 through the timing T4 include the error based on the GPS reception influence that occurs in the timing T1. Accordingly, in FIG. 4, the respective errors of the position NT1 to the position NT4 are correlated with one another.

In a timing T5 (the second timing), a GPS reception influence (a second influence) that is different from the GPS reception influence that occurs in the timing T1 is assumed to occur.

In FIG. 4, in the timing T5, an actual vehicle position is set as a position MT5. Further, in FIG. 4, in the timing T5, the GPS vehicle position observed by the observation unit 21 is set as a position NT5. That is, by the influence based on a GPS signal, which occurs in the timing T5, the observation unit 21 observes the position NT5 apart by a distance 15 from the position MT5 which is the actual vehicle position, as the GPS vehicle position. This indicates that there is a separation error of the distance 15 from the actual vehicle position, with respect to the GPS vehicle position which is observed by the observation unit 21 by the GPS reception influence that occurs in the timing T5.

As illustrated in FIG. 4, the separation error in the timing T5 differs as compared with the separation errors in the respective timing T1 through the timing T4. FIG. 4 illustrates a case where the distance 15 representing the separation error is shorter than all of the separation errors of the distance 11 through the distance 14. That is, FIG. 4 illustrates a case where the separation error based on the GPS reception influence that occurs in the timing T5 is smaller as compared with the separation error based on the GPS reception influence that occurs in the timing T1. The separation error in the timing T5 differs from the other separation errors as above, because the GPS reception influence, which is different from the GPS reception influence that occurs in the timing T1, occurs in the timing T5.

As described above, the GPS reception unit 5 calculates the GPS vehicle position based on the received GPS signal by taking into account the GPS vehicle position which is calculated at the previous time. Consequently, when the GPS reception unit 5 calculates the position NT5 that is the GPS vehicle position in the timing T5, the GPS reception unit 5 calculates the position NT5 by taking into account the GPS vehicle position calculated in the timing T4. The GPS vehicle position calculated in the timing T4 is calculated by taking the position NT3 into account, and is calculated with the GPS signal received in the timing T1 being reflected. However, the GPS vehicle position calculated in the timing T5 can be regarded as the GPS vehicle position in which the GPS signal received in the timing T1 is not reflected. This is because the GPS vehicle position observed in the timing T5 is not located on the virtual straight line KT as illustrated in FIG. 4. The GPS vehicle position is not located in the virtual straight line KT in the timing T5 as above, because the GPS reception influence, which is different from the GPS reception influence that occurs in the timing T1, occurs in the timing T5, and the separation errors that occur in the timing T1 through the timing T4 differ from the separation error that occurs in the timing T5. Accordingly, the GPS vehicle position calculated in the timing T5 can be regarded as the GPS vehicle position in which the GPS vehicle position, which is calculated based on the GPS signal received in the timing T1, is not reflected. That is, this corresponds to the fact that the observation unit 21 observes the GPS vehicle position in which the GPS signal received in the timing T1 is not reflected, in the timing T5.

The positioning error of the GPS vehicle position observed by the observation unit 21 in the timing T5 in FIG. 4, that is, the error of the position NT5 is a larger error as compared with the positioning error of the GPS vehicle position in the case where the GPS reception influence is absent, due to the GPS reception influence which occurs in the timing T5. Further, the positioning error of the GPS vehicle position observed by the observation unit 21 in the timing T5 is the error which is different from the positioning errors of the GPS vehicle positions in the respective timings of the timing T1 through the timing T4, because the GPS reception influences are different. Accordingly, the error of the position NT5 is not correlated with the respective errors of the position NT1 to the position NT4.

In FIG. 4, a correlation time constant indicates the following period. That is, in FIG. 4, the correlation time constant is a period from the timing T1 (the first timing) through the timing T5 (the second timing) in which the GPS signal received in the timing T1 is not reflected in observation of the GPS vehicle position by the observation unit 21. More specifically, in FIG. 4, the correlation time constant is the period after the GPS reception influence (the first influence) occurs in the timing T1, and the separation error based on the GPS reception influence occurs to the observed GPS vehicle position, until the GPS reception influence (the second influence) differing from the GPS reception influence occurs, and the separation error based on the different GPS reception influence occurs to the GPS vehicle position.

Note that in FIG. 4, the correlation time constant is not limited to the aforementioned period. For example, the correlation time constant may be a period after the GPS reception influence occurs, and the separation error between the actual vehicle position and the GPS vehicle position, based on the GPS reception influence occurs until the separation error is eliminated. That is, in the case of FIG. 4, the period is a period from the timing T1 until the separation error by the GPS reception influence which occurs in the timing T1 is eliminated. Here, elimination does not indicate that the separation distance becomes the separation distance by the GPS reception influence in the timing T5, but indicates that the separation distance reaches a value close to zero, that is, the error between the actual vehicle position and the GPS vehicle position is eliminated.

The correlation time constant is calculated based on an advance test, simulation and the like, and is stored in the storage unit or the like. In the present embodiment, the longest period of a plurality of periods shown in the above, which are calculated with respect to various roadways such as mountain roads and roadways provided under highways, is stored in the storage unit or the like as the correlation time constant.

As described above, at the time of calculating the Kalman gain $K_k$, the observation error of the GPS vehicle position among the components included by the error covariance matrix of the observables, is set as shown in equation (9). That is, the estimation unit 22 sets what is obtained by multiplying the positioning error of the GPS vehicle position by $\sqrt{(2\tau)}$ as the observation error of the GPS vehicle position.

Equation (9) is calculated as follows.

When the error of the GPS vehicle position follows a primary Markov process of $\tau$ that is the correlation time constant, and $\sigma$ that is the positioning error of the GPS vehicle position, an autocorrelation function of the error of the GPS vehicle position is expressed by equation (10). The autocorrelation function refers to a function indicating an autocorrelation of the error of the GPS vehicle position with respect to the time point in the case of the present embodiment.

[Expression 10]

$$C(t) = \sigma e^{t/\tau} \quad (10)$$

Equation (10) shows that the autocorrelation function of the error of the GPS vehicle position is an exponential function based on τ that is the correlation time constant, and σ that is the positioning error of the GPS vehicle position. As shown in equation (10), as the time point t is larger, the autocorrelation of the error of the GPS vehicle position becomes larger.

When the autocorrelation function of the error of the GPS vehicle position is expressed by equation (10), equation (11) shown as follows is obtained based on the Wiener-Khinchin theorem, and a relationship between a power spectrum and variance.

[Expression 11]

$$\frac{dErr(t)}{dt} = -\frac{1}{\tau}Err(t) + \sqrt{\frac{2}{\tau}}\sigma_t \quad (11)$$

In equation (11), Err (t) represents the error of the GPS vehicle position. Further, in equation (11), σt represents a positioning error of the GPS vehicle position at a time point t. Equation (11) can be transformed into equation (12) by transposing a left side in equation (11) to a right side, transposing a first term in the right side in equation (11) to the left side, and simplifying the result by τ.

[Expression 12]

$$Err(t) = -\tau\frac{dErr(t)}{dt} + \sqrt{2\tau}\,\sigma_t \quad (12)$$

In equation (12), Err(t)/dt of a first term in a right side represents a change amount of the error of the GPS vehicle position. That is, equation (12) indicates that the error of the GPS vehicle position is expressed by a sum of what is obtained by multiplying the change amount of the error of the GPS vehicle position by "-τ", and what is obtained by multiplying the positioning error of the GPS vehicle position at the time point t by "√(2τ)".

Here, Err(t)/dt of the first term in the right side of equation (12) can be regarded as zero for the reason shown as follows.

The change amount of the error of the GPS vehicle position is an amount that is difficult to be observed and estimated. Consequently, an expectation value of the change amount of the error of the GPS vehicle position can be considered as zero. Further, by an arithmetic operation of the GPS reception unit 5, the GPS vehicle position is calculated as the position without a variation in the error, that is, the position where the error does not have a change amount to the error. Consequently, the change amount of the error of the GPS vehicle position is considered as zero. From the above, the change amount of the error of the GPS vehicle position can be regarded as zero.

When the change amount of the error of the GPS vehicle position is set as zero for the above reason, the first term in the right side is eliminated in equation (12), and equation (12) is expressed by equation (13).

[Expression 13]

$$Err(t) = \sqrt{2\tau}\sigma_t \quad (13)$$

Equation (13) indicates that the error of the GPS vehicle position at the time point t is expressed by multiplying the positioning error of the GPS vehicle position at the time point t by √(2τ). Here, the right side in equation (13) corresponds to the right side in equation (9), and is the observation error of the GPS vehicle position. That is, the observation error of the GPS vehicle position is expressed by assigning a weight of ~(2τ) based on τ that is a correlation time constant, to the positioning error of the GPS vehicle.

When the estimation unit 22 calculates the Kalman gain $K_k$, the estimation unit 22 sets the measuring error of the GPS vehicle position based on equation (13), with respect to the GPS vehicle position out of the components included in the error covariance matrix of the observables. That is, the estimation unit 22 assigns the weight of √(2τ) to the positioning error of the GPS vehicle position that is observed by the observation unit 21, and inputs the positioning error of the GPS vehicle position to which the weight is assigned, to the error covariance matrix of the observables of the Kalman gain $K_k$ as the observation error of the GPS vehicle position. More specifically, the estimation unit 22 sets the observation error of the GPS vehicle position as shown in equation (14) and equation (15), and inputs the observation error to the error covariance matrix of the observables of the Kalman gain $K_k$, with respect to the GPS vehicle position out of the components included in the error covariance matrix of the observables.

[Expression 14]

$$r_k^{xGPS} = \sqrt{2\tau}\sigma_k^{gx} \quad (14)$$

$r_k$

In equation (14), a subscript "k" represents a time point. Further, superscripts "xGPS" and "gx" represent x-axis components. That is, a right side in equation (14) shows an observation error of the GPS vehicle position in an x-axis at the time point k. Further, a left side in equation (14) shows what is obtained by multiplying √(2τ) by the positioning error of the GPS vehicle position in the x-axis at the time point k. That is, the x-axis component of the observation error of the GPS vehicle position is set by the weight of √(2τ) being assigned to the x-axis component of the positioning error of the GPS vehicle position.

[Expression 15]

$$r_k^{yGPS} = \sqrt{2\tau}\sigma_k^{gy} \quad (15)$$

In equation (15), a subscript "k" represents a time point. Further, superscripts "yGPS" and "gy" represent y-axis components. That is, a right side in equation (15) shows an observation error of the GPS vehicle position in a y-axis at the time point k. Further, a left side in equation (15) shows what is obtained by multiplying √(2τ) by the positioning error of the GPS vehicle position in the y-axis at the time point k. That is, the y-axis component of the observation error of the GPS vehicle position is set by the weight of √(2τ) being assigned to the y-axis component of the positioning error of the GPS vehicle position.

Assignment of the weight of √(2τ) is assignment for collectively dealing the positioning errors of the GPS vehicle positions, which are colored errors, as one positioning error (hereinafter, expressed as a "collective GPS vehicle position positioning error") of the GPS vehicle position in the Kalman filter, in a period represented by τ. As described above, τ represents the correlation time constant, and is the period until another timing that is a timing in which the GPS signal received in a certain timing is not reflected in observation of the GPS vehicle position by the observation unit 21 and is different from the certain timing. Further, τ is the period including the positioning error of the GPS vehicle position that is the colored error based on the GPS reception influence that occurs in the certain timing. The estimation unit 22 collectively deals the positioning errors of the GPS vehicle positions that are colored errors in the period of τ in the Kalman filter as the collective GPS vehicle position positioning error by assigning the weight of √(2τ), and calculates the Kalman gain $K_k$.

The collective GPS vehicle position positioning error can be regarded as a white error. This is because there is no correlation between the collective GPS vehicle position positioning error, and the other positioning errors of the GPS vehicle positions except for the positioning errors of the GPS vehicle positions that are colored errors in the period of τ. For example, in the case of FIG. 4, when the positioning errors of the GPS vehicle positions from the timing T1 through the timing T4 are collectively set as the collective GPS vehicle position positioning error, the collective GPS vehicle position positioning error is different in the GPS reception influence, and therefore, is not correlated with the positioning error of the GPS vehicle position in the timing T5. Further, the positioning error of the collective GPS vehicle position is not correlated with a positioning error of a GPS vehicle position in a previous timing of the timing T1, either. FIG. 4 illustrates the case where the GPS reception influence occurs in the timing T1. Consequently, even when a GPS reception influence occurs in the previous timing of the timing T1, the GPS reception influence differs from the GPS reception influence which occurs in the timing T1. Accordingly, the collective GPS vehicle position positioning error is not correlated with the positioning error of the GPS vehicle position in the previous timing of the timing T1, either. By collectively setting the positioning errors of the GPS vehicle positions which are the colored errors in the period of τ as the collective GPS vehicle position positioning error, the collective GPS vehicle position positioning error can be regarded as a white error.

Further, the collective GPS vehicle position positioning error is the positioning error of the GPS vehicle position that includes all of the positioning errors of the GPS vehicle positions which indicate the collective errors in the period of τ. For example, when the positioning errors of the GPS vehicle positions in the timing T1 through the timing T4, that is, the respective errors of the position NT1 through the position NT4 are set as the collective GPS vehicle position positioning error in FIG. 4, the collective GPS vehicle position positioning error include the respective errors of the position NT1 through the position NT4. Accordingly, the collective GPS vehicle position positioning error can be regarded as the white error, so that each of the positioning errors of the GPS vehicle positions included in the collective GPS vehicle position positioning error corresponds to a part of the white error. This indicates that by collectively setting the positioning errors of the GPS vehicle positions, which indicate the colored errors in the period of τ as the collective GPS vehicle position positioning error, the positioning errors of the GPS vehicle positions indicating the colored errors in the period of τ are dealt as part of the white error in the Kalman filter. That is, by collectively dealing the positioning errors of the GPS vehicle positions, which indicate the colored errors in the period of τ, in the Kalman filter as the collective GPS vehicle position positioning error, the positioning errors of the GPS vehicle positions which indicate the colored errors in the period of τ can be regarded as the white error.

For example, when the positioning errors of the GPS vehicle positions in the timing T1 through the timing T4, that is, the respective errors of the position NT1 through the position NT4 are set as the collective GPS vehicle position positioning error in FIG. 4, each of the errors of the position NT1 through the position NT4 to which √(2τ) is assigned is dealt in the Kalman filter as a part of the white error. By collectively dealing the respective errors of the position NT1 through the position NT4 in the Kalman filter as the collective GPS vehicle position positioning error, the respective errors of the position NT1 through the position NT4 can be regarded as white errors.

As described above, assignment of the weight of √(2τ) is assignment for collectively dealing the positioning errors of the GPS vehicle positions which are colored errors in the period represented by τ as the collective GPS vehicle position positioning error in the Kalman filter. Accordingly, the positioning error of the GPS vehicle position to which the weight of √(2τ) is assigned, that is, the left side in equation (13) is a part of the collective GPS vehicle position positioning error, and can be regarded as a white error. That is, the observation error of the GPS vehicle position that is set as in equation (13) can be regarded as a white error. Thereby, by setting the observation error of the GPS vehicle position as in equation (13), the observation error of the GPS vehicle position can be properly inputted to the error covariance matrix of the observables which is on the precondition that the errors are white errors, and the estimation unit 22 can accurately calculate the Kalman gain $K_k$. The estimation unit 22 can precisely calculate the Kalman gain $K_k$, and therefore can precisely estimate the state concerning the present location of the vehicle.

Further, by setting the observation error of the GPS vehicle position as in equation (13), the estimation unit 22 can estimate the state of the present location of the vehicle with high precision, every time the estimation unit 22 receives a GPS signal. As described above, in the Kalman filter, the precondition is such that the errors included in the error covariance matrix of the observables are white errors. Consequently, when the GPS reception influence occurs, if the positioning error of the GPS vehicle position is directly inputted to the Kalman filter as the observation error of the GPS vehicle position, every time the GPS signal is received, precision of estimation of the state of the present location of the vehicle is reduced. In contrast with this, it is conceivable to input the positioning error of the GPS vehicle position to the Kalman filter directly as the observation error of the GPS vehicle position, after the period of τ, and estimate the state of the present location of the vehicle. However, this causes the fear of reduction of frequency of estimation of the state concerning the present location of the vehicle, and reduction in precision of estimation. Here, the observation error of the GPS vehicle position is set as in equation (13), whereby even though the positioning errors of the GPS vehicle positions in the period of τ are colored errors, the positioning errors are dealt as white errors in the Kalman filter. Accordingly, by setting the observation error of the GPS vehicle position as in equation (13), the estimation unit 22 can precisely estimate the state of the present location of the vehicle, every time the estimation unit 22 receives a GPS signal.

In FIG. 4, the period represented by τ is the period after the GPS reception influence occurs in the timing T1, and the separation error based on the GPS reception influence occurs to the GPS vehicle position which is observed until a GPS reception influence that differs from the GPS reception influence occurs, and the separation error based on the different GPS reception influence occurs to the GPS vehicle position. The estimation unit 22 can set the positioning errors of the GPS vehicle positions that are colored errors in this period as the observation errors of the GPS vehicle positions which can be regarded as white errors by assignment of the weight (√/(2τ)) based on this period. Consequently, the estimation unit 22 can precisely calculate the Kalman gain $K_k$ by inputting the observation error of the GPS vehicle position which is set, to the error covariance matrix ($R_k$) of the observables. Accordingly, the estimation unit 22 can accurately estimate the state concerning the present location of the vehicle in this period.

Further, in FIG. 4, the period represented by τ may be a period after the GPS reception influence occurs, and the separation error based on the GPS reception influence occurs to the GPS vehicle position until the separation error is eliminated. Even in the period like this, the estimation unit 22 can set the positioning errors of the GPS vehicle positions which are colored errors in the period like this, as the observation errors of the GPS vehicle positions, which can be regarded as white errors, by assignment of the weight (√/(2τ)) based on the period. Consequently, the estimation unit 22 can accurately calculate the Kalman gain $K_k$ by inputting the observation errors of the GPS vehicle positions which are set to the error covariance matrix ($R_k$) of the observables. Accordingly, the estimation unit 22 can accurately estimate the state concerning the present location of the vehicle in the period after the GPS reception influence occurs and the separation error based on the GPS reception influence occurs to the GPS vehicle position until the separation error is eliminated.

Note that when the navigation system 1 is configured to be able to determine presence or absence of the GPS reception influence, if the navigation system 1 determines that the GPS reception influence is present, the observation error of the GPS vehicle position may be set as in equation (16) and equation (17).

[Expression 16]

$$r_k^{xGPS} = \sqrt{2\tau\{(\sigma_k^{gx})^2 + \text{var}_{rx}\}} \quad (16)$$

$\text{VAR}_{rx}$ represents variance of the x-axis component of the GPS vehicle position, and the x-axis component of the position (the position of the vehicle in the vehicle state prediction value) of the vehicle which is predicted in the prediction processing, at the time point k. That is, equation (16) sets the observation error of the GPS vehicle position by adding the variance to equation (14).

[Expression 17]

$$r_k^{yGPS} = \sqrt{2\tau\{(\sigma_k^{gy})^2 + \text{var}_{ry}\}} \quad (17)$$

$\text{VAR}_{ry}$ represents variance of the y-axis component of the GPS vehicle position, and the y-axis component of the position of the vehicle predicted in the prediction processing (the position of the vehicle of the vehicle state prediction value), at the time point k. That is, equation (17) sets the observation error of the GPS vehicle position by adding the variance to equation (15).

In this way, the determination of presence or absence of the GPS reception influence is configured to be enabled, and when the GPS reception influence is present, the observation error of the GPS vehicle position is set as shown in equation (16) and equation (17). Consequently, by adding variance of the GPS vehicle position and the position of the vehicle which is predicted in the prediction processing, the observation error of the GPS vehicle position includes the variance based on these positions, and therefore the observation error of the GPS vehicle position is calculated more accurately. Consequently, the Kalman gain $K_k$ is calculated more accurately, and the estimation unit 22 can estimate the state concerning the present location of the vehicle with high precision.

Note that equation (16) and equation (17) are equations that are each configured to be able to determine presence or absence of the GPS reception influence, and each sets the observation error of the GPS vehicle position when the GPS reception influence is present. However, equation (16) and equation (17) may be used irrespective of presence or absence of the GPS reception influence. This is because when the GPS reception influence is absent, $\text{VAR}_{rx}$ in equation (16) and $\text{VAR}_{ry}$ in equation (17) are considered to approximate to zero. Accordingly, equation (16) and equation (17) may be used in setting of the observation error of the GPS vehicle position, irrespective of presence or absence of the GPS reception influence. In this case, the aforementioned effect is also provided.

As described above, the control unit 2 of the navigation system 1 executes evaluation of the link to be a target of map matching based on the state of the vehicle which is estimated.

Figure 5:
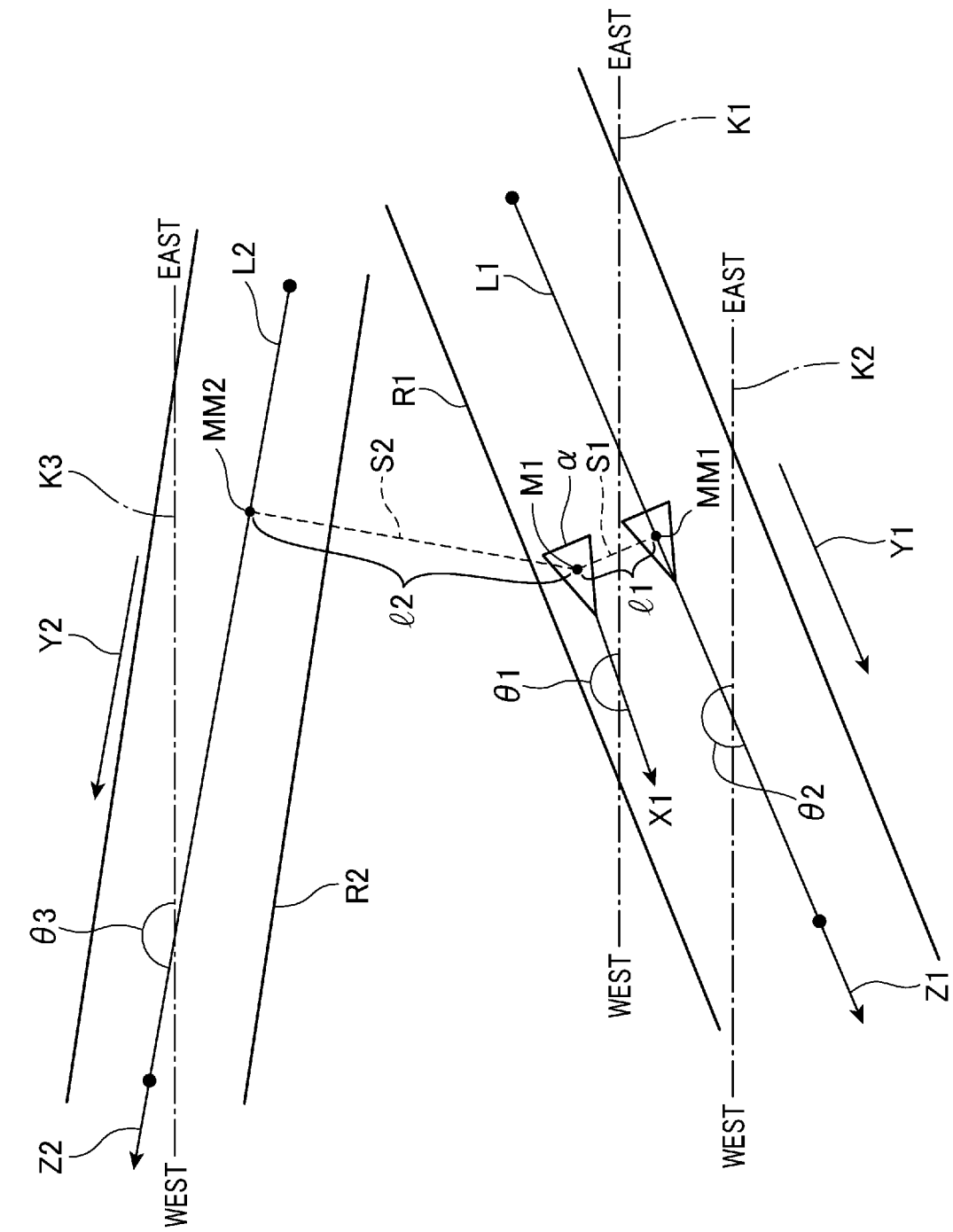
FIG. 5 is a diagram for explaining map matching based on an estimated vehicle state.

FIG. 5 is a diagram illustrating a road R1 and a road R2 on a map to explain processing of map matching based on the state of the vehicle which is estimated. In FIG. 5, the road R1 is a road that extends to a direction Y1. Further, the road R2 is a road that extends to a direction Y2 that is not parallel with the direction Y1.

In FIG. 5, a link L1 is a link corresponding to the road R1. Further, a link L2 is a link corresponding to the road R2.

Further, in FIG. 5, a mark a is a mark indicating the position of the vehicle, which is estimated by the estimation unit 22. Hereinafter, in explanation using FIG. 5, the vehicle is assumed to be estimated as being located in a position M1 and traveling toward a traveling direction X1 by the estimation unit 22. As illustrated in FIG. 5, the position M1 is a position on the road R1, and is a position separated to a right side as seen in the direction Y1, from a center of a width direction of the road R1.

When a relationship among the road R1, the road R2 and the position of the vehicle which is estimated is a relationship illustrated in FIG. 5, the control unit 2 first refers to the map data 3a, at a time of map matching, and acquires a map matching candidate link that is a link to be a candidate of map matching. The control unit 2 acquires one or a plurality of links that is or are located within a predetermined range that is set in advance from the position of the vehicle which is estimated, and has or have errors of the azimuths of the vehicle and link being within the predetermined range, as the map matching candidate link. In the example in FIG. 5, the link L1 and the link L2 are links that are located within a predetermined range from the position M1 which is the estimated position of the vehicle, and have errors of the azimuths of the vehicle and the link within a predetermined range. Consequently, the control unit 2 acquires the link L1 and the link L2 as the map matching candidate links.

Next, the control unit 2 calculates an evaluation amount by which the link is evaluated for each of the acquired map matching candidate links.

The evaluation amount is a value that is calculated by equation (18) shown as follows based on the error of the position of the vehicle which is estimated and the position of the map matching candidate link, and the error of the azimuth of the vehicle which is estimated and an azimuth of the map matching candidate link.

$$\tau = \delta x^2/\Delta x^2 + \delta y^2/\Delta y^2 + \delta \theta^2/\Delta \theta^2 \qquad (18)$$

Here, the error of the position of the vehicle which is estimated and the position of the map matching candidate link is a difference in the x-axis direction and the y-axis direction between an intersection point of a perpendicular line in a case where the perpendicular line is extended from the position of the vehicle which is estimated to the map matching candidate link and the map matching candidate link, and the position of the vehicle which is estimated. In equation (18), $\delta x$ represents a difference between an x-coordinate of the intersection point and an x-coordinate of the position of the vehicle which is estimated. Further, $\delta y$ represents a difference between a y-coordinate of the intersection point and a y-coordinate of the position of the vehicle which is estimated.

In the example in FIG. 5, an error of the position of the vehicle which is estimated and the position of the link L1 is a difference in the x-axis direction and the y-axis direction between an intersection point MM1 of a perpendicular line S1 that is extended from the position M1 to the link L1 and the link L1, and the position M1. Further, in FIG. 5, an error of the position of the vehicle which is estimated and the position of the link L2 is a difference in the x-axis direction and the y-axis direction between an intersection point MM2 of a perpendicular line S2 that is extended from the position M1 to the link L2 and the link L2, and the position M1.

Further, an error of the azimuth of the vehicle which is estimated, and the azimuth of the map matching candidate link is a difference between an angle corresponding to the azimuth of the vehicle which is estimated, and an angle corresponding to the azimuth of the map matching candidate link.

As described above, the azimuth of the vehicle means a compass bearing of the traveling direction of the vehicle. In the example in FIG. 5, the azimuth of the vehicle which is estimated is a compass bearing of the traveling direction X1. Further, the angle corresponding to the azimuth of the vehicle means a counterclockwise separation angle between a direction to the east and the azimuth of the vehicle, with the direction to the east as a reference. In the example in FIG. 5, the angle corresponding to the azimuth of the vehicle which is estimated is an angle $\theta 1$ when a virtual straight line K1 is a virtual straight line extending in an east-west direction.

Further, the azimuth of the link means a compass bearing of a direction in which the link extends. The direction in which the link extends means a direction corresponding to a direction in which the vehicle can travel in a road corresponding to the link, out of the two directions along the link. Further, the angle corresponding to the azimuth of the link means a counterclockwise separation angle between the direction to the east and the azimuth of the link with the direction to the east as the reference.

In the example in FIG. 5, the azimuth of the link L1 is a compass bearing of a direction Z1. Further, an angle corresponding to the azimuth of the link L1 is an angle $\theta 2$ when a virtual straight line K2 is a virtual straight line extending in the east-west direction. Further, in the example in FIG. 5, an azimuth of the link L2 is a compass bearing of a direction Z2. Further, an angle corresponding to the azimuth of the link L2 is an angle $\theta 3$ when a virtual straight line K3 is a virtual straight line extending in the east-west direction.

In the example in FIG. 5, an azimuth error of the vehicle and the link L1 is a difference between the angle $\theta 1$ and the angle $\theta 2$. Further, an azimuth error of the vehicle and the link L2 is a difference between the angle $\theta 1$ and the angle $\theta 3$. That is, in the example in FIG. 5, in equation (18), $\delta \theta$ represents the difference between the angle $\theta 1$ and the angle $\theta 2$, or the difference between the angle $\theta 1$ and the angle $\theta 3$.

As shown in equation (18), the estimation amount $\tau$ is calculated by a sum of what is obtained by dividing a value obtained by squaring $\delta x$ by a value obtained by squaring $\Delta x$, what is obtained by dividing a value obtained by squaring $\delta y$ by a value obtained by squaring $\Delta y$, and what is obtained by dividing a value obtained by squaring $\delta \theta$ by a value obtained by squaring $\Delta \theta$. $\Delta x$ represents the error of the position in the x-axis direction of the vehicle estimated by the estimation unit 22. That is, $\Delta x^2$ represents variance of the position in the x-axis direction of the vehicle which is estimated by the estimation unit 22. Further, $\Delta y$ represents an error of the position in the y-axis direction of the vehicle estimated by the estimation unit 22. That is, $\Delta y^2$ represents variance of the position in the y-axis direction of the vehicle, which is estimated by the estimation unit 22. Further, $\Delta \theta$ represents the error of the azimuth of the vehicle, which is estimated by the estimation unit 22. That is, $\Delta \theta^2$ represents variance of the azimuth of the vehicle, which is estimated by the estimation unit 22. $\Delta x^2$, $\Delta y^2$ and $\Delta \theta^2$ are variances included by the error covariance matrix of the vehicle state estimation values which are estimated by the estimation unit 22. In this way, the evaluation amount is a value calculated by a sum of a value obtained by making the error of the position of the vehicle and the position of the link dimensionless by the error of the position of the vehicle which is estimated, and a value obtained by making the error of the azimuth of the vehicle and the azimuth of the link dimensionless by the error of the position of the vehicle which is estimated.

In the example in FIG. 5, the control unit 2 calculates an evaluation amount of the link L1 and an evaluation amount of the link L2 which are acquired as the map matching candidate links.

When the evaluation amount of the link L1 is set as $\tau 1$, the difference in the x-coordinate between the position M1 and the intersection point MM1 is set as $\delta x 1$, the difference in the y-coordinate between the position M1 and the intersection point MM1 is set as $\delta y 1$, and the difference between the angle $\theta 1$ and the angle $\theta 2$ is set as $\delta \theta 1$, the evaluation amount $\tau 1$ is expressed by equation (19) shown below.

$$\tau 1 = \delta x 1^2/\Delta x^2 + \delta y 1^2/\Delta y^2 + \delta \theta 1^2/\Delta \theta^2 \qquad (19)$$

When the evaluation amount of the link L2 is set as $\tau 2$, the difference in the x-coordinate between the position M1 and the intersection point MM2 is set as $\delta x 2$, the difference in the y-coordinate between the position M1 and the intersection point MM2 is set as $\delta y 2$, and the difference between the angle $\theta 1$ and the angle $\theta 3$ is set as $\delta \theta 2$, the evaluation amount $\tau 2$ is expressed by equation (20) shown below.

$$\tau 2 = \delta x 2^2/\Delta x^2 + \delta y 2^2/\Delta y^2 + \delta \theta 2^2/\Delta \theta^2 \qquad (20)$$

In the example in FIG. 5, the distance l1 is smaller than the distance l2. That is, the differences in the x-coordinate and the y-coordinate in the position M1 and the intersection point MM2 are smaller than the differences in the x-coordinate and the y-coordinate in the position M1 and the intersection point MM2. Further, in the example in FIG. 5, the difference between the angle $\theta 1$ and the angle $\theta 2$ is smaller than the difference between the angle $\theta 1$ and the angle θ3. Consequently, the value of τ1 which is the evaluation amount of the link L1 is smaller than the value of τ2 which is the evaluation amount of the link L2. Accordingly, the control unit 2 determines the link L1 with a small evaluation amount as the link to which the present location of the vehicle is matched.

In this way, the control unit 2 executes evaluation of the link which is a target of map matching based on the state of the vehicle which is estimated. As described above, at a time of evaluating the link, the control unit 2 evaluates the link based on variance included by the error covariance matrix of the vehicle state estimation value estimated by the estimation unit 22. The error covariance matrix is a matrix calculated based on the Kalman gain $K_k$ to which the observation error of the GPS vehicle position is inputted as a white error, and is a matrix including the errors which are calculated with high precision. Accordingly, the control unit 2 can accurately evaluate the link by using variance included by the error covariance matrix in evaluation of the link.

As described above, the navigation system 1 (the position estimation system, the on-vehicle system) includes the GPS reception unit 5 that receives a GPS signal, the observation unit 21 that observes the observables including the GPS vehicle position (the GPS positioning position) based on the GPS signal received by the GPS reception unit 5, and the estimation unit 22 that estimates the state quantities concerning the present location of the vehicle based on the observables observed by the observation unit 21 and on the Kalman filter. The estimation unit 22 calculates the vehicle state prediction values (the prediction values of the state quantities), and the error covariance matrix (the errors of the prediction values) of the vehicle state prediction values. Further, the estimation unit 22 calculates the vehicle state estimation values (the estimation values of the state quantities), and the error covariance matrix (the errors of the estimation values) of the vehicle state estimation values based on the vehicle state prediction values, the error covariance matrix of the vehicle state prediction values, and the error covariance matrix (the errors of the observables) of the observables that are observed by the observation unit 21. When the estimation unit 22 calculates the vehicle state estimation values and the error covariance matrix of the vehicle state estimation values, the estimation unit 22 assigns, to the positioning error of the GPS vehicle position, a weight based on the period from a certain timing (the first timing) to another timing (the second timing) that is a timing in which the GPS signal received in the certain timing is not reflected in observation of the GPS vehicle position by the observation unit 21, and is different from the certain timing.

By assigning the weight based on the period to the positioning error of the GPS vehicle position, the positioning error of the GPS vehicle position is set as the observation error of the GPS vehicle position that can be regarded as a white error. Accordingly, the observation error of the GPS vehicle position can be properly inputted to the error covariance matrix of the observables which is on the precondition that the errors are white errors, and the estimation unit 22 can accurately calculate the Kalman gain $K_k$. The estimation unit 22 can accurately calculate the Kalman gain $K_k$, and therefore can estimate the state concerning the present location of the vehicle with high precision.

Further, when the estimation unit 22 calculates the vehicle state estimation values and the error covariance matrix of the vehicle state estimation values, the estimation unit 22 assigns, to the positioning error of the GPS vehicle position, a weight based on the period after the error (the separation error) based on the GPS reception influence (the first influence) which occurs in a certain timing occurs to the GPS vehicle position, until an error (a separation error) based on a GPS reception influence (a second influence) that occurs in another timing different from the certain timing and differs from the GPS reception influence, occurs to the GPS vehicle position.

In the case of FIG. 4, the period refers to the period after the GPS reception influence occurs in the timing T1, and the separation error based on the GPS reception influence occurs to the GPS vehicle position which is observed, until a GPS reception influence that are different from the GPS reception influence occurs in the timing T5 and a separation error based on the different GPS reception influence occurs to the GPS vehicle position. When the estimation unit 22 calculates the Kalman gain $K_1$, the estimation unit 22 inputs the positioning error of the GPS vehicle position which is a colored error in this period to the error covariance matrix ($R_k$) of the observables as the observation error of the GPS vehicle position that can be regarded as a white error by assignment of the weight ($\sqrt{/(2\tau)}$) based on this period, and calculates the Kalman gain $K_k$. Accordingly, the estimation unit 22 can estimate the state concerning the present location of the vehicle in this period with high precision.

Further, when the estimation unit 22 calculates the vehicle state estimation value, and the error covariance matrix of the vehicle state estimation value, the estimation unit 22 assigns the weight based on the period after the error (the separation error) based on the GPS reception influence occurs to the GPS vehicle position until the error is eliminated to the error of the GPS vehicle position.

As described above, the period represented by τ may be a period after a GPS reception influence occurs, and the separation error based on the GPS reception influence occurs to the GPS vehicle position, until the separation error is eliminated. Even in the period like this, the estimation unit 22 inputs the positioning error of the GPS vehicle position that is a colored error in this period to the error covariance matrix ($R_k$) of the observables as the observation error of the GPS vehicle position that can be regarded as a white error, and calculates the Kalman gain $K_k$. Accordingly, the estimation unit 22 can estimate the state concerning the present location of the vehicle in this period with high precision.

The aforementioned embodiment only illustrates one mode of the present invention, and modifications and applications can be arbitrarily made within the range without departing from the gist of the present invention.

For example, FIG. 1 is a schematic diagram illustrating the functional configuration of the navigation system 1 by dividing the functional configuration in accordance with the main processing contents in order to facilitate understanding of the invention of the present application, and the configuration of the navigation system 1 can be divided into a larger number of components in accordance with the processing contents. Further, a single component also can be divided to execute more processing.

Further, for example, processing units in the flowcharts in FIG. 2 and FIG. 3 are divided in accordance with main processing contents, in order to facilitate understanding of the processing of the control unit 2, and the present invention is not limited by the way of dividing the processing units and the names of the processing units. The processing of the control unit 2 may be divided into a larger number of processing units in accordance with the processing contents. Further, the single processing unit may be divided to include more processing.

Further, in the aforementioned embodiment, the position estimation system is illustrated as the navigation system 1 that is the on-vehicle system installed in the vehicle, but the mode of the position estimating system is arbitrary, and may be a portable type system that are carried by a pedestrian, for example.

REFERENCE SIGNS LIST

1 Navigation system (position estimation system, on-vehicle system)
5 GPS reception unit
21 Observation unit
22 Estimation unit

What is claimed is:

1. A position estimation system, comprising:
a speed sensor that detects a speed of a mobile body which is a vehicle or a pedestrian;
a gyro sensor that detects an angular speed by rotation of the mobile body;
a GPS receiver that receives a GPS signal; and
a controller that includes a CPU and a memory;
wherein the controller comprises:
an observation circuit that observes, in every predetermined observation interval, the speed, a position and an azimuth of the mobile body as observables based on a signal which indicates the speed and which is outputted from the speed sensor, a signal which indicates the angular speed and which is outputted from the gyro sensor, and a GPS signal received by the GPS receiver; and
an estimation circuit that estimates state quantities concerning a present location based on the observables observed by the observation circuit and on a Kalman filter,
wherein the estimation circuit
calculates prediction values of the state quantities, and errors of the prediction values,
calculates estimation values of the state quantities and errors of the estimation values, based on the prediction values, the errors of the prediction values and errors of the observables which are observed by the observation circuit, and
at a time of calculating the estimation values and the errors of the estimation values,
assigns a weight based on a period after an error based on a first influence relating to reception of the GPS signal occurs to a GPS positioning position, until an error based on a second influence different from the first influence occurs to the GPS positioning position, to the error of the GPS positioning position.

2. The position estimation system according to claim 1, wherein the estimation circuit
at a time of calculating the estimation values and the errors of the estimation values,
assigns a weight based on a period after an error based on an influence relating to reception of the GPS signal occurs to the GPS positioning position until the error is eliminated, to the error of the GPS positioning position.

3. The position estimation system according to claim 2, wherein the position estimation system is an on-vehicle system that is installed on a vehicle, and estimates the state quantities concerning a present location of the vehicle.

4. The position estimation system according to claim 1, wherein the position estimation system is an on-vehicle system that is installed on a vehicle, and estimates the state quantities concerning a present location of the vehicle.

5. The position estimation system according to claim 1, wherein the position estimation system is an on-vehicle system that is installed on a vehicle, and estimates the state quantities concerning a present location of the vehicle.

6. An estimation method performed by a position estimation system having:
a speed sensor that detects a speed of a mobile body which is a vehicle or a pedestrian;
a gyro sensor that detects an angular speed by rotation of the mobile body;
a GPS receiver that receives a GPS signal; and
a controller that includes a CPU and a memory; comprising
by an observation circuit of the controller, observing in every predetermined observation interval, the speed, a position and an azimuth of the mobile body as observables based on a signal which indicates the speed and which is outputted from the speed sensor, a signal which indicates the angular speed and which is outputted from the gyro sensor, and a GPS signal received by the GPS receiver;
by an estimation circuit by the controller, estimating state quantities concerning a present location based on a Kalman filter and observables including a GPS positioning position based on a GPS signal, comprising:
by an estimation circuit, calculating prediction values of the state quantities, and errors of the prediction values;
calculating estimation values of the state quantities and errors of the estimation values, based on the prediction values, the errors of the prediction values and errors of the observables; and
at a time of calculating the estimation values and the errors of the estimation values by an estimation circuit,
assigns a weight based on a period after an error based on a first influence relating to reception of the GPS signal occurs to the GPS positioning position, until an error based on a second influence different from the first influence occurs to the GPS positioning position, to the error of the GPS positioning position.

7. The estimation method according to claim 6, wherein at a time of calculating the estimation values and the errors of the estimation values,
a weight based on a period after an error based on an influence relating to reception of the GPS signal occurs to the GPS positioning position, until the error is eliminated is assigned to the error of the GPS positioning position.

8. The estimation method according to claim 7, wherein state quantities concerning a present location of a vehicle is estimated.

9. The estimation method according to claim 6, wherein state quantities concerning a present location of a vehicle is estimated.

10. The estimation method according to claim 6, wherein state quantities concerning a present location of a vehicle is estimated.

* * * * *